Patented Apr. 7, 1942

2,279,194

UNITED STATES PATENT OFFICE 2,279,194

AZEOTROPIC DISTILLATION

Edmund Field, Wilmington, Del., assignor to E. I. du Pont de Nemours & Company, Wilmington, Del., a corporation of Delaware No Drawing. Application August 22, 1940, Serial No. 353,674

5 Claims. (Cl. 202—42)

This invention relates to a method for separating substances which either boil closely together or form binaries such that separation cannot be achieved by simple fractional distillation. More particularly, this invention relates to the separation of cyclohexane from benzene and is a modification of U. S. Patent 2,212,810, which relates to the same separation.

It is an object of this invention to provide a method for separating closely-boiling substances or substances which form azeotropes where separation by fractional distillation is difficult or impractical. It is a further object of this invention to provide a method for separating cyclohexane from benzene. It is an additional object of this invention to increase the efficiency of separation of cyclohexane from benzene by altering the ratio of acetone to cyclohexane in the distillate, from that of the acetone-cyclohexane azeotrope. Other objects and advantages of the invention will be apparent from the following specification.

I have found, as described in U. S. Patent 2,212,810, that cyclohexane can be removed from a mixture containing cyclohexane and substances of similar boiling point, such as benzene (B. P. 80.1° C.) (which cannot be distilled ordinarily from cyclohexane, B. P. 80.8° C.) by adding acetone to the mixture and distilling. As described in the patent previously referred to, I have found that acetone forms a binary azeotrope with cyclohexane (67.3% acetone by weight) which boils at a lower temperature (53.1° C.) than either acetone or any benzene-cyclohexane mixture and a weight ratio of acetone to cyclohexane of at least 2.0:1.0 is preferable when separating these substances by distilling under a pressure of one atmosphere.

According to the present invention cyclohexane can be removed from a mixture containing cyclohexane and substances of a similar boiling point by adding methyl acetate to the mixture and distilling. Methyl acetate and cyclohexane form a binary containing 77.7% methyl acetate and 22.3% clclohexane, the binary boiling at 55.3° C. As an added and preferred feature of the present invention, cyclohexane is removed from a mixture containing cyclohexane and substances of a similar boiling point by adding methyl acetate and acetone to the mixture and distilling. The addition of acetone and methyl acetate to the cyclohexane-containing mixture permits a more efficient separation than when acetone alone is utilized in the process such as described in U. S. Patent 2,212,810 which relates to the separation of cyclohexane from benzene.

Although the proportions of methyl acetate added to the cyclohexane-containing mixture, and specifically the proportions of methyl acetate to the mixture of cyclohexane and acetone, may vary over a considerable range, I have found that the greatest efficiency of operation may be obtained by adding the quantity of methyl acetate to a cyclohexane-containing mixture which corresponds approximately with the proportions of methyl acetate and cyclohexane in the binary which is formed between these two substances. Thus, by the addition of 77.7% by weight of methyl acetate to a cyclohexane-containing mixture there will result a cyclohexane-methyl acetate binary containing 77.7% by weight methyl acetate and 22.3% by weight cyclohexane. When acetone is so utilized as a separating medium, such as described in U. S. Patent 2,212,810, the quantity of methyl acetate necessary for the formation of a cyclohexane-acetone-methyl acetate ternary azeotrope is considerably smaller. Thus, the addition of 18.0% by weight methyl acetate to a cyclohexane-acetone mixture on distillation gives a product containing 31.9% by weight cyclohexane, 50.1% acetone and 18.0% methyl acetate. The distillation occurs at 51.7–53.0.

The general technique described in U. S. Patent 2,212,810 may be followed in the operation of the present invention, the prime difference between the present invention and that described in U. S. Patent 2,212,810 being in the use of methyl acetate in place of or together with the acetone of my prior application. Thus, when treating cyclohexane-benzene mixtures for recovery of benzene or cyclohexane, or both, each in the pure form, methyl acetate may be added to the cyclohexane-benzene mixture to which acetone has previously been added or to which acetone may be simultaneously added and the mixture thereafter distilled. Preferably, at least 2 parts by weight of methyl acetate are employed per part of cyclohexane.

In the preferred operation of this invention, methyl acetate is utilized together with acetone in the removal of cyclohexane from benzene or conversely in the removal of benzene from cyclohexane because of the smaller quantities of methyl acetate necessary when used in conjunction with acetone.

The process of this invention preferably involves water-washing of the azeotrope formed between methyl acetate and cyclohexane, if methyl acetate is utilized alone for cyclohexane removal and the process is carried out by conducting the binary to the bottom of the baffle tower down which water is flowing. The countercurrent flow of the methyl acetate and water affects solution of the methyl acetate in water and release of the cyclohexane which rises to the top of the tower and is removed by decantation. The methyl acetate dissolved in the water may be recovered for further use by distillation from its mixture with water. The cyclohexane may be obtained chemically pure by removing the traces of residual water by distillation or by the use of common drying agents.

When the mixture of methyl acetate and acetone are utilized according to the preferred embodiments of this invention, the same water-wash treatment of the ternary azeotrope formed between methyl acetate, acetone and cyclohexane is carried out as has been described in connection with the removal of methyl acetate from cyclohexane by water-washing. The same effect is observed, namely, the cyclohexane rises to the top of the tower and is removed by decantation, whereas the methyl acetate and acetone are dissolved in the water and removed by distillation as an azeotrope which may be recycled or separated for further use in cyclohexane separation.

The process as above described may be applied to any mixture of compounds containing cyclohexane, provided the boiling temperatures of the additional constituents or any azeotrope mixture between such constituents or between such constituents and methyl acetate or acetone or both are sufficiently remote from the boiling temperatures of the cyclohexane-methyl acetate binary or the cyclohexane-methyl acetate-acetone ternary. In certain cases involving constituents, part of which are water soluble, water extraction may be substituted for distillation. None of these primary treatments are necessary, however, in the following illustrative case, the technique of which I have successfully employed in conjunction with a process and the simultaneous manufacture of acetone and cyclohexane by exchange of hydrogen between isopropanol and benzene as described in copending application of E. P. Bartlett, S. N. 265,932.

As a process of this type involves equilibrium, the product is a mixture of isopropanol, acetone, benzene and cyclohexane. Such a mixture contains constituents for forming at least three different azeotropic mixtures. Benzene-isopropanol (boiling point 71.9° C.), cyclohexane-isopropanol (B. P. 68.6° C.), both of which are revealed in the literature, and acetone-cyclohexane (B. P. 53.1° C). From such a mixture cyclohexane may be removed quantitatively in the form of a ternary azeotrope with acetone and methyl acetate. A cyclohexane-acetone-methyl acetate ternary is then separated into its constituents by countercurrent water extraction such as previously outlined and the acetone-methyl acetate binary is recovered from the water solvent by simple distillation.

Following the removal of cyclohexane, the residual mixture of acetone, isopropanol, and benzene is topped to remove acetone and the unconverted benzene and isopropanol are returned to the hydrogenation unit for reprocessing.

While I have illustrated my invention by certain applications, I do not limit my claims to such specific cases, for there are many possible problems of separation where their solutions may be employed as a basic principle the recovery of cyclohexane from mixtures by means of its azeotrope with methyl acetate or its ternary with methyl acetate and acetone.

I claim:

1. A method for the removal of cyclohexane from admixture with benzene which comprises treating a cyclohexane-benzene-containing mixture with methyl acetate and distilling off the resultant cyclohexane-methyl-acetate-containing azeotrope.

2. A method for the removal of cyclohexane from admixture with acetone and benzene which comprises treating the cyclohexane-containing mixture with methyl acetate and distilling off the resultant cyclohexane-methyl acetate-ternary azeotrope.

3. A method for the removal of cyclohexane from admixture with benzene which comprises treating the cyclohexane-containing mixture with methyl acetate and distilling off the resultant cyclohexane-methyl acetate-containing azeotrope and thereafter removing the cyclohexane by treating the resultant distillate with water.

4. A method for the removal of cyclohexane from admixture with acetone and benzene which comprises treating the cyclohexane-containing mixture with methyl acetate and distilling off the resultant cyclohexane-methyl acetate-acetone ternary azeotrope and thereafter removing the cyclohexane by treating the resultant distillate with water.

5. A method for the removal of cyclohexane from admixture with benzene which comprises treating the cyclohexane-containing mixture with methyl acetate in the proportions of at least 2.0 parts of methyl acetate per part of cyclohexane and thereafter distilling off the resultant cyclohexane-methyl acetate-containing azeotrope.

EDMUND FIELD.